April 5, 1938.   L. W. WOLFE   2,113,524
PROTRACTOR
Filed May 21, 1935
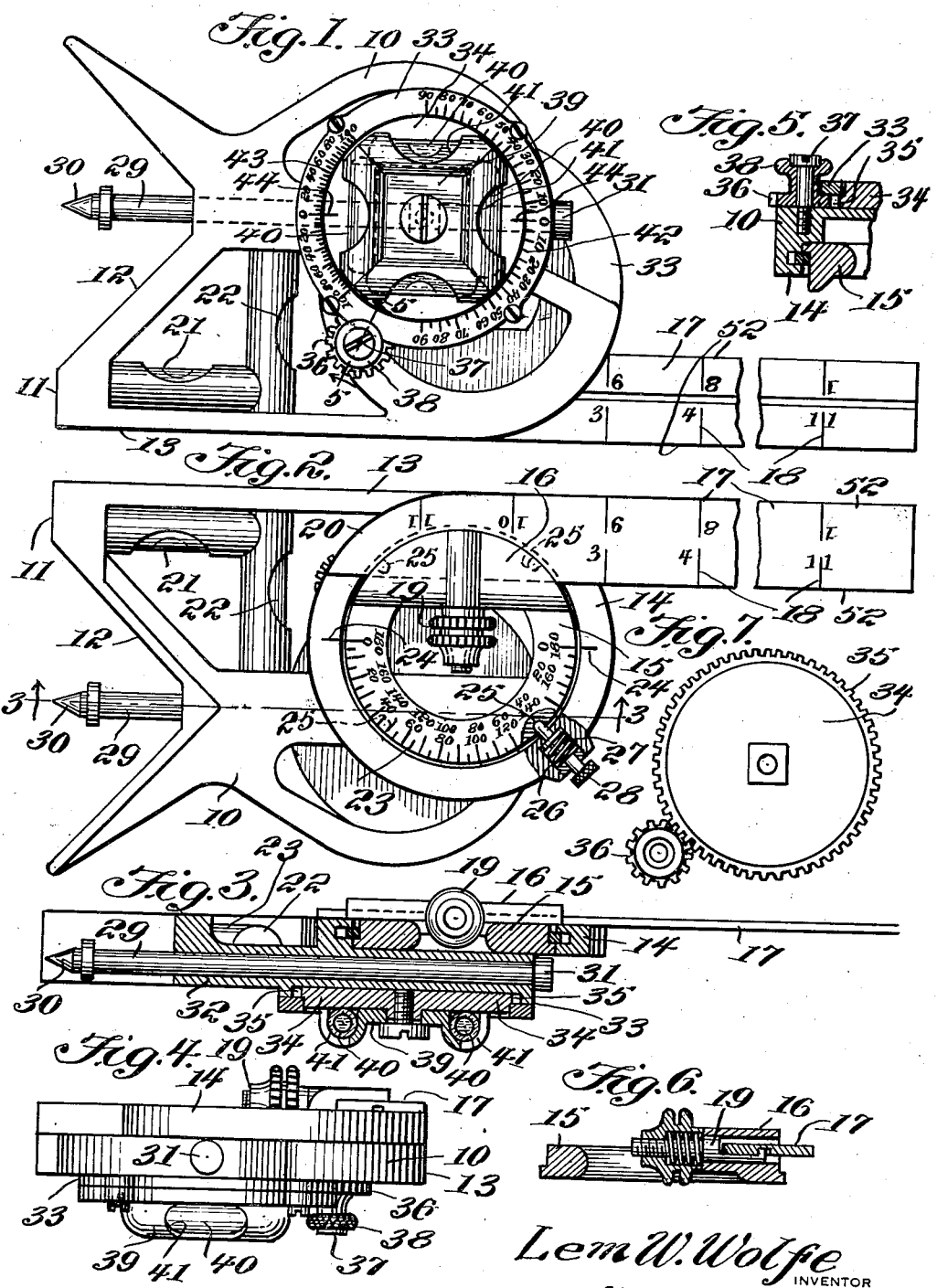
Lem W. Wolfe
INVENTOR
BY Victor J. Evans & Co.
ATTORNEY
WITNESS G. T. L. Wright Patented Apr. 5, 1938

2,113,524

UNITED STATES PATENT OFFICE 2,113,524

PROTRACTOR

Lem W. Wolfe, Maracaibo, Venezuela

Application May 21, 1935, Serial No. 22,615

2 Claims. (Cl. 33—88)

The invention relates to a protractor.

The primary object of the invention is the provision of an instrument of this character wherein through the use of a head, a spirit level body, a protractor scale and a ruling blade, these being adjustably related, there can be determined accurately the required set of a piece of work or several lays of work, particularly in the placement of angle joinders between pipe sections or runs thereof where such pipe sections or runs are disposed out of alignment either in the same plane with each other or one at a higher level than the other so that the artificer will be able to make the required cut without waste of material and without mental labor and time required as would be ordinarily spent through the service of other instrumentalities.

A still further object of the invention is the provision of an instrument of this character, wherein the construction thereof is novel in form and the degree scales and spirit levels are disposed therein so that readings of the same may be had at a glance and the adjustable parts are susceptible of being latched to hold the same in determined positions so that accuracy will be assured thereby.

A still further object of the invention is the provision of an instrument of this character, which is comparatively simple in its construction, thoroughly reliable and efficient in its operation, strong, durable, readily and easily manipulated and adjusted and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a plan view of the instrument constructed in accordance with the invention.

Figure 2 is a similar view looking toward the opposite side thereof and partly broken away.

Figure 3 is a sectional view taken on the line 3—3 of Figure 2 looking in the direction of the arrows.

Figure 4 is an end elevation.

Figure 5 is a fragmentary sectional view taken on the line 5—5 of Figure 1 looking in the direction of the arrows.

Figure 6 is a fragmentary sectional view showing in detail the thumb screw lock for the sliding blade or beam of the instrument.

Figure 7 is a detailed plan view of the adjusting gearings for the protractor scale ring.

Similar reference characters indicate corresponding parts throughout the several views in the drawing.

Referring to the drawing in detail, particularly Figures 1 to 7 inclusive, the instrument comprises a main frame 10 which constitutes a body or stock having at one end thereof a straight edge 11 which is cut into to provide a V-shaped notch 12 forming a centering head while at one side of this body 10 is a straight side edge 13, these edges 11 and 13 effecting a true square in the use of the body. The end of the body 10 opposite and remote from the notch 12 is formed with a circular rim 14 providing a seat for a turnable protractor ring 15, it having a thickened channeled portion 16 offset with relation to the rim 14 and constituting a guide and carrier portion for a ruling blade 17 which, as is customary, carries at opposite faces thereof scales or measuring graduations 18 for lineal measurements in the use thereof. The offset portion has fitted therewith the usual knurled nut equipped clamp or latching member 19 for holding the blade 17 in its shifted position as the same is slidably fitted in this thickened portion 16, the blade 17 at the end next to the body 10 being rounded at 20 similarly to the circular contour of the rim 14 so that when the said blade 17 has been shifted in the thickened portion 16 to bring this end 20 next to the protractor ring 15 the said end 20 will match the rim 14 and thus eliminate protrusion with respect thereto. The blade 17 when parallel with the edge 13 of the body 10 has its outermost edge flush therewith and will constitute an extension of such edge especially when the instrument is used for spanning purposes and in leveling an object or objects in relation to each other.

The body 10 is of skeleton formation and built within the same are the spirit levels 21 and 22, respectively, these being disposed at right angles to each other, the level 21 lies parallel with the edge 13 while the level 22 is parallel with the edge 11 of said body so that these levels are convenient in the placement of the body 10 for level reading with respect to the edges 11 and 13. Either of these levels 21 and 22 are serviceable for plumb reading in the placement of the body 10 with respect to a piece of work. The edges 11 and 13 are the working edges of the body 10.

The protractor ring 15 is held within the rim 14 in the usual well-known manner for rotation therein and on its exposed face is provided a protractor scale 23 cooperating with witness points 24 provided on the rim 14, in this instance the points 24 being located diametrically opposite each other for the reading of the degrees under the adjustment of the protractor ring 15. In the periphery of the ring 15 are sockets 25, these being engageable by a latching pin 26 it being thrown to latching position by a spring 27 and at its outer end carries a finger grip 28, the pin being suitably set within the rim 14 for the engagement thereof selectively in said sockets 25 in the ring 15. These sockets 25 in the ring 15 are set with relation to the scale 23 so as to permit of the latching of the blade 17 at a ninety degree angle with respect to the perpendicular.

On the body 10 at the side opposite the carriage of the protractor ring 15 is formed a circular rim 33 in which is fitted a rotatable disk 34 and this disk has peripherally thereof gear teeth 35 meshing with a companion pinion 36 journaled upon a stud screw 37 fitted in the body 10, the pinion 36 being formed with a turning knob 38 and thus it will be seen from Figure 5 of the drawing that by turning the knob 38 the pinion 36 will transmit motion to the disk 34 for the rotation thereof. Carried by this disk 34 is a squared mounting 39 forming a casing for a group of spirit levels 40, these being set at right angles to each other and are exposed through reading openings 41 in said casing at the four sides of the same. These spirit levels 40 are for cooperation with the edges 11 and 13 and the centering notch 12 of the instrument. Carried by the rim 33 are the graduated scales 42 and 43, respectively. The scale 42 is a degree scale while the scale 43 is a percent scale and cooperating with these scales 42 and 43 are the pointers or indicators 44 provided on the disk 34 in the servicing of the instrument hereinafter fully described.

What is claimed is:

1. An instrument of the character described comprising a frame having a straight side and rounded at one end, a full circular protractor rotatably fitting the rounded end of said frame and having a rule blade guide peripherally thereof, a rule blade slidable in said guide and having a rounded end for matching the rounded end of said frame when registering therewith, means fitted in the guide for locking the blade in adjusted position, a circular rim on the frame at the side opposite the protractor, a rotatable disk fitting the rim and having peripheral gear teeth, a stud screw on the frame next to the rim, a pinion journaled on the screw and meshing with the gear teeth on the disk and having a turning knob projected laterally from the frame, a squared mounting detachably fitting the outermost side of the said disk, and a group of spirit levels held by said mounting and disposed at right angles to each other adjacent to the sides of said mounting and selectively visible at the said sides of the mounting for cooperation with the straight edge of the frame.

2. An instrument of the character described comprising a frame having a straight side and rounded at one end, a full circular protractor rotatably fitting the rounded end of said frame and having a rule blade guide peripherally thereof, a rule blade slidable in said guide and having a rounded end for matching the rounded end of said frame when registering therewith, means fitted in the guide for locking the blade in adjusted position, a circular rim on the frame at the side opposite the protractor, a rotatable disk fitting the rim and having peripheral gear teeth, a stud screw on the frame next to the rim, a pinion journaled on the screw and meshing with the gear teeth on the disk and having a turning knob projected laterally from the frame, a squared mounting detachably fitting the outermost side of the said disk, a group of spirit levels held by said mounting and disposed at right angles to each other adjacent to the sides of said mounting for cooperation with the straight edge of the frame, graduated scales on said rim and diametrically opposed to each other, and pointers on the disk and coactive with the said scales, respectively.

LEM W. WOLFE.